(12) United States Patent
Hirauchi et al.

(10) Patent No.: US 10,785,854 B2
(45) Date of Patent: Sep. 22, 2020

(54) LIGHTING SYSTEM AND LIGHTING APPARATUS

(71) Applicant: PANASONIC INTELLECTUAL PROPERTY MANAGEMENT CO., LTD., Osaka (JP)

(72) Inventors: Yasuhito Hirauchi, Osaka (JP); Shinji Matsuda, Osaka (JP)

(73) Assignee: PANASONIC INTELLECTUAL PROPERTY MANAGEMENT CO., LTD., Osaka (JP)

(*) Notice: Subject to any disclaimer, the term of this patent is extended or adjusted under 35 U.S.C. 154(b) by 0 days.

(21) Appl. No.: 16/356,851

(22) Filed: Mar. 18, 2019

(65) Prior Publication Data
US 2019/0297709 A1 Sep. 26, 2019

(30) Foreign Application Priority Data
Mar. 26, 2018 (JP) .................................. 2018-058268

(51) Int. Cl.
| H05B 37/02 | (2006.01) |
| H05B 47/10 | (2020.01) |
| H05B 47/185 | (2020.01) |
| H04B 3/54 | (2006.01) |
| H04W 4/80 | (2018.01) |
| H05B 45/10 | (2020.01) |

(52) U.S. Cl.
CPC ............. *H05B 47/185* (2020.01); *H04B 3/54* (2013.01); *H04W 4/80* (2018.02); *H05B 45/10* (2020.01)

(58) Field of Classification Search
CPC ................ H05B 37/02; H05B 37/0263; H05B 37/0272; H05B 37/034; H05B 47/10; H05B 47/18; H05B 47/185; H05B 47/19; H04B 3/50; H04B 3/54; H04B 2201/71346; H04W 4/80
See application file for complete search history.

(56) References Cited

U.S. PATENT DOCUMENTS

| 6,750,781 | B1* | 6/2004 | Kim ..................... H02J 13/0082 340/12.32 |
| 9,819,910 | B2* | 11/2017 | Huang .................... H04N 7/183 |
| 10,264,658 | B2* | 4/2019 | Ohashi .................. B60W 50/04 |
| 2002/0065583 | A1* | 5/2002 | Okada ....................... H04B 3/54 700/295 |

(Continued)

FOREIGN PATENT DOCUMENTS

| JP | 5399882 B2 | 1/2014 |
| KR | 20140134552 A * | 11/2014 |

*Primary Examiner* — Thai Pham
(74) *Attorney, Agent, or Firm* — McDermott Will & Emery LLP

(57) ABSTRACT

Disclosed is a lighting system that can control lighting using a PLC communications while reducing an increase in cost for equipment. The lighting system includes a controller configured to communicate through a PLC communications, and a lighting apparatus group having a plurality of lighting apparatuses. The plurality of lighting apparatuses includes a master configured to communicate through the PLC communications, and a slave capable of communicating with the master. The master communicates with the slave through a communications that is different from the PLC communications.

3 Claims, 2 Drawing Sheets

(56) References Cited

U.S. PATENT DOCUMENTS

| | | | |
|---|---|---|---|
| 2009/0322251 A1* | 12/2009 | Hilgers | G06F 3/1446 |
| | | | 315/297 |
| 2011/0175533 A1* | 7/2011 | Holman | F21V 33/006 |
| | | | 315/130 |
| 2011/0285526 A1* | 11/2011 | Tanaka | H05B 33/0884 |
| | | | 340/514 |
| 2012/0300437 A1* | 11/2012 | Lu | F21V 21/005 |
| | | | 362/147 |
| 2013/0134774 A1* | 5/2013 | Kennedy | G06F 1/26 |
| | | | 307/2 |
| 2017/0118816 A1* | 4/2017 | Ohashi | H05B 33/0827 |
| 2017/0146203 A1* | 5/2017 | Belaidi | H05B 45/60 |
| 2017/0223806 A1* | 8/2017 | Fiebert | H05B 45/00 |
| 2019/0008024 A1* | 1/2019 | Hidaka | H04L 12/2807 |
| 2019/0264901 A1* | 8/2019 | Wan | F21V 23/023 |

\* cited by examiner

LIGHTING SYSTEM AND LIGHTING APPARATUS

CROSS-REFERENCE TO RELATED APPLICATION

This application claims priority to Japanese Patent Application No. 2018-058268 filed on Mar. 26, 2018, the entire disclosure of which is incorporated by reference herein.

BACKGROUND

The present disclosure relates to a lighting system using power line communication (PLC).

Japanese Patent No. 5399882 discloses a lighting system having a configuration where lighting elements to be controlled through PLC are divided into groups, and a signal carrier frequency between a group master and a controller is distinguished from a signal carrier frequency between the group master and a slave in order to reduce communication time and improve communication reliability.

SUMMARY

The present disclosure attempts to provide a lighting system capable of controlling lighting using PLC while reducing an increase in cost for equipment.

A lighting system according to one embodiment of the present disclosure includes: a controller configured to communicate through power line communications; and a lighting apparatus group including a plurality of lighting apparatuses having a master configured to communicate through the power line communications and at least one slave capable of communicating with the master. The master communicates with the controller through the power line communications, and communicates with the at least one slave through a communication system that is different from the power line communications, and the plurality of lighting apparatuses control lighting according to an instruction obtained through the power line communications or an instruction obtained through the communication system.

The present disclosure can provide a lighting system capable of controlling lighting using power line communications while reducing an increase in cost for equipment.

DETAILED DESCRIPTION

Embodiments of the present disclosure are described below with reference to the drawings. The following description of advantageous embodiments is only an example in nature, and is not intended to limit the scope, applications, or use of the present disclosure.

Figure 1:
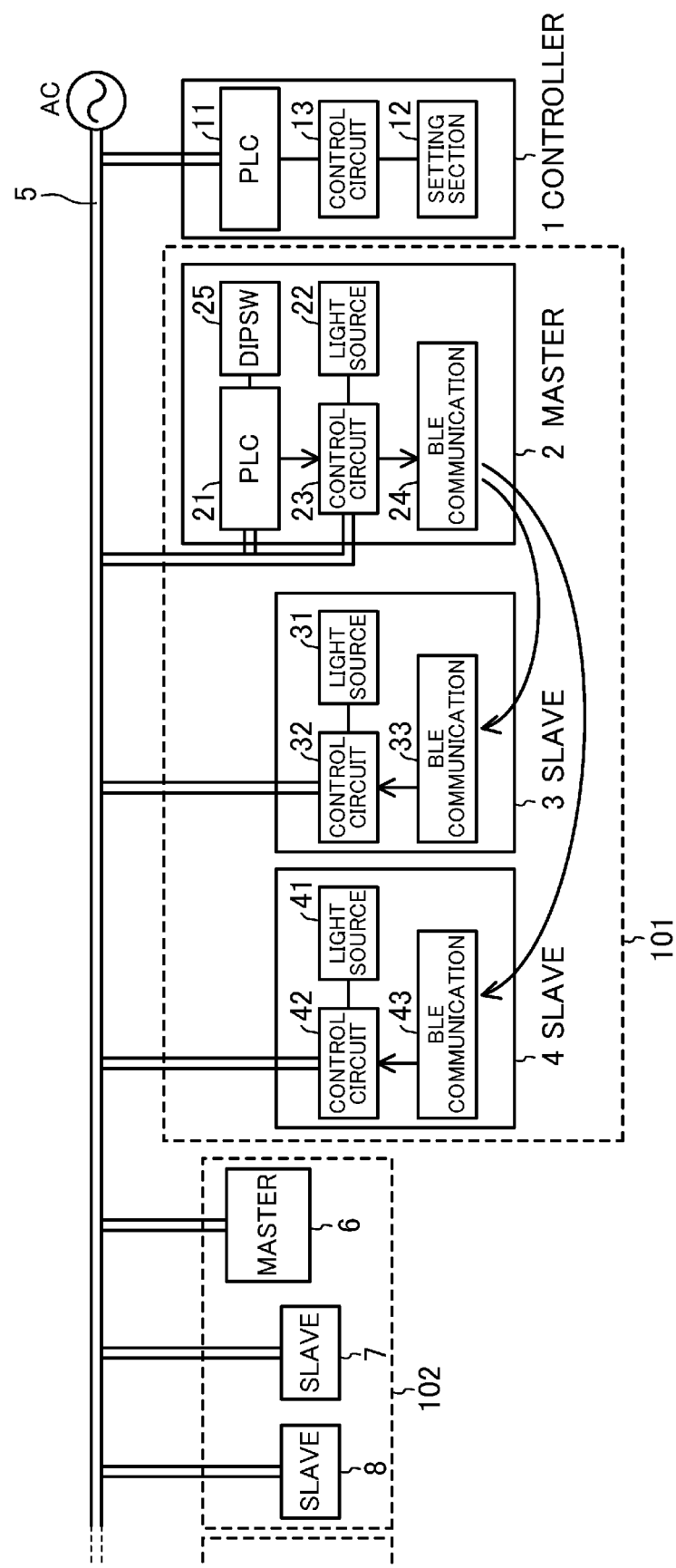
FIG. 1 is a block diagram showing an exemplary configuration of a lighting system according to an embodiment.

FIG. 1 is a block diagram showing an exemplary configuration of a lighting system according to an embodiment. As shown in FIG. 1, the lighting system according to an embodiment includes a controller 1 controlling an entire system, and lighting control units 101 and 102 as lighting apparatus groups. The lighting control unit 101 includes a plurality of lighting apparatuses 2, 3, and 4. The lighting apparatus 2 serves as a master, and the lighting apparatuses 3 and 4 serve as slaves. The lighting control unit 102 includes a plurality of lighting apparatuses 6, 7, and 8. The lighting apparatus 6 serves as a master, and the lighting apparatuses 7 and 8 serve as slaves. The controller 1, the lighting apparatuses 2, 3, and 4 included in the lighting control unit 101, and the lighting apparatuses 6, 7, and 8 included in the lighting control unit 102 are connected to a power path 5 through which power output from a commercial AC power supply is supplied.

The controller 1 includes a power line communication (PLC) circuit 11 (shown as "PLC" in the figure), a setting section 12, and a control circuit 13. The PLC circuit 11 transmits or receives a signal through power line communications superposing a high-frequency current upon the power path 5. The setting section 12 is configured as, e.g., a switch, an LCD, or an LED, and sets various elements in the lighting system. The control circuit 13 controls the PLC circuit 11 and the setting section 12. The control circuit 13 is configured as, e.g., a microcomputer.

In the lighting control unit 101, the lighting apparatus 2 serving as the master includes a PLC circuit 21, a light source 22, a control circuit 23, and a near field communication circuit 24 (shown as "BLE communication" in the figure). The PLC circuit 21 transmits or receives a signal through power line communications superposing a high-frequency current upon the power path 5. The light source 22 is configured as, e.g., an LED. The control circuit 23 controls a lighting state, such as a dimming level, of the light source 22. The near field communication circuit 24 communicates through, e.g., Bluetooth that is a registered trademark. Bluetooth is an example of a near field communication. The near field communication circuit 24 communicates with the lighting apparatuses 3 and 4 serving as the slaves. The control circuit 23 also controls the PLC circuit 21 and the near field communication circuit 24. The lighting apparatus 2 is provided with a dip switch 25 setting an address for the PLC.

The lighting apparatus 3 includes a light source 31 such as an LED, a control circuit 32 controlling, e.g., a dimming level of the light source 31, and a near field communication circuit 33 communicating through Bluetooth. The lighting apparatus 4 includes a light source 41 such as an LED, a control circuit 42 controlling, e.g., a dimming level of the light source 41, and a near field communication circuit 43 communicating through Bluetooth. The near field communication circuits 33 and 43 communicate with the lighting apparatus 2 serving as the master. The control circuits 32 and 42 respectively control the near field communication circuits 33 and 43. The lighting apparatuses 3 and 4 serving as the slaves receive power through the power path 5, but do not communicate through the power line communications.

When the light sources 22, 31, and 41 are LEDs, the control circuits 23, 32, 42 include, for example, an inverter that converts an AC voltage into a DC voltage, and a PWM circuit that converts a DC voltage into a pulse voltage. The control circuits 23, 32, and 42 change the duty ratio of the pulse applied to the LED to control the dimming level and the color matching of the RGB combined light. The light sources 22, 31, and 41 are not limited to LEDs. Alternatively, for example, they may be an incandescent lamp or a fluorescent lamp.

Although not shown, the lighting apparatus 6 serving as the master in the lighting control unit 102 has the same or similar configuration to the lighting apparatus 2 in the lighting control unit 101, and the lighting apparatuses 7 and 8 serving as the slaves have the same or similar configuration to the lighting apparatuses 3 and 4 in the lighting control unit 101.

Figure 2:
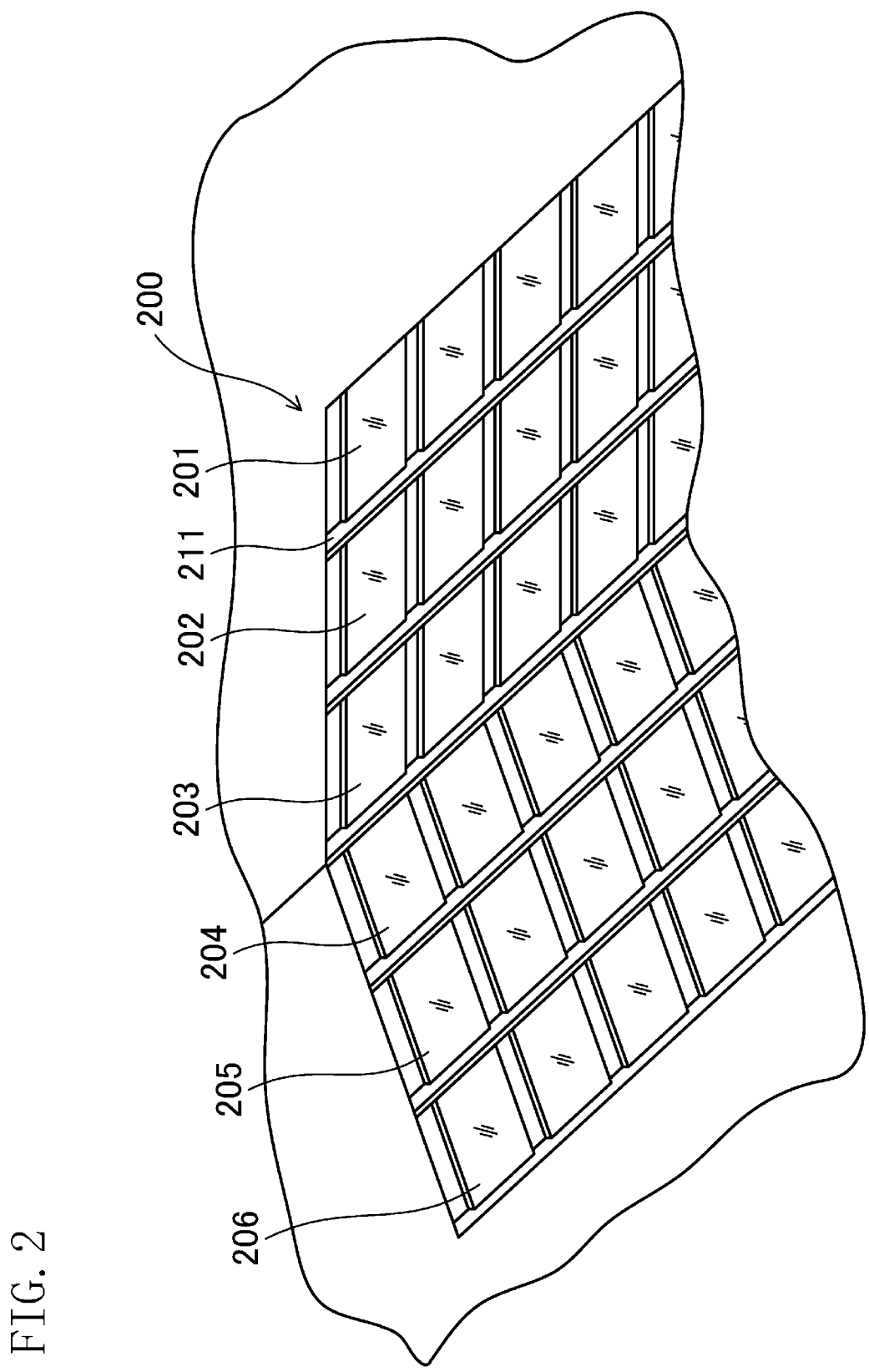
FIG. 2 illustrates an example in which the lighting system according to the embodiment is used.

FIG. 2 imaginarily illustrates an example in which the lighting system according to the embodiment is used. In the example of FIG. 2, a lighting 200 is disposed on a ceiling of a train station. In the lighting 200 of FIG. 2, LED lightings 201 to 206 constitute one lighting control unit, and for example, the LED lighting 201 corresponds to a master of the lighting control unit. The LED lightings 201 to 206 are fixed to a fixing member 211. The fixing member 211 is an example of a coupler that couples a lighting apparatus serving as a master to a lighting apparatus serving as a slave, or couples lighting apparatuses serving as slaves to each other.

Next, an operation of the lighting system according to the embodiment will be described.

First, the installer places the controller 1 and the lighting control units 101 and 102 at predetermined positions. Then, the dip switch sets transmission addresses, for the PLC, of the lighting apparatuses 2 and 6 respectively serving as the masters of the lighting control units 101 and 102. Here, it is assumed that an address "1" is set in the dip switch 25 of the lighting apparatus 2 serving as the master.

The user sets the dimming level of each of lighting control units 101 and 102 via the setting section 12 of the controller 1. Here, it is assumed that a dimming level "X" is set for the lighting control unit 101. The controller 1 transmits a control signal including the dimming level "X" and the address "1" from the PLC circuit 11 to the power path 5.

In the lighting control unit 101, the lighting apparatus 2 serving as the master receives the control signal including its own address "1" that has been transmitted via the power path 5, by the PLC circuit 21. The PLC circuit 21 reads the dimming level "X" included in the control signal, and transmits a dimming signal indicating the dimming level "X" to the control circuit 23. This dimming level "X" corresponds to an instruction received from the controller 1. The control circuit 23 controls the lighting state of the light source 22 in accordance with the dimming level "X." The control circuit 23 also transmits a dimming signal indicating the dimming level "X" to the near field communication circuit 24 to control the near field communication circuit 24 such that the dimming signal is transmitted to the outside. The near field communication circuit 24 performs a broadcast transmission of the dimming signal indicating the dimming level "X" to the lighting apparatuses 3 and 4 serving as the slaves.

The lighting apparatus 3 receives the dimming signal that has been provided by broadcast transmission via the near field communication circuit 33. The near field communication circuit 33 transmits the dimming signal indicating the dimming level "X" to the control circuit 32. The control circuit 32 controls the lighting state of the light source 31 according to the dimming level "X." Likewise, the lighting apparatus 4 receives the dimming signal that has been provided by broadcast transmission via the near field communication circuit 43. The near field communication circuit 43 transmits the dimming signal indicating the dimming level "X" to the control circuit 42. The control circuit 42 controls the lighting state of the light source 41 according to the dimming level "X."

As a result, the dimming level of the light source 22 of the lighting apparatus 2 serving as the master is adjusted to the dimming level "X." Also, the dimming level of each of the light sources 31 and 41 in the lighting apparatuses 3 and 4 serving as the slaves is adjusted to the dimming level "X."

As in the lighting control unit 101, the lighting control unit 102 can control the dimming level in accordance with the instruction from the controller 1.

As can be seen, according to the embodiment, the lighting system can control lighting using the power line communications. In addition, not all of the lighting apparatuses need to communicate through the power line communications, thereby reducing the number of the lighting apparatuses capable of communicating through the power line communications. Therefore, it is possible to perform energy saving and space performance by fine lighting control while reducing an increase in cost for equipment.

In the above embodiment, Bluetooth is used as a communication system in the lighting control unit. However, the present disclosure is not limited thereto, and any communication system may be used as long as it is different from the power line communications. For example, a near field communication other than Bluetooth may be used, and an infrared communications may be used. A wire communications may be used to transmit or receive, e.g., a PWM signal and a digital signal.

Also, like the application example of FIG. 2, the lighting control unit may have a configuration in which a lighting apparatus serving as a master is coupled to a lighting apparatus serving as a slave or lighting apparatuses serving slaves are coupled together by a coupler. In such a configuration, communication may be performed via the coupler. For example, the coupler is supposed to couple a housing of the lighting apparatus serving as the master to a housing of the lighting apparatus serving as the slave. A signal line for communication is built in the coupler. The lighting apparatuses coupled by the coupler can communicate with each other via the signal line built in the coupler.

Further, examples of the communication system of the PLC include an amplitude modulation/demodulation (ASK) system, a frequency modulation/demodulation (FSK) system, and a spectrum spread (SS) system using a wide frequency band. In this embodiment, any communication system may be used.

The above embodiment has exemplified the configuration in which the number of lighting control units is two and the number of lighting apparatuses of each of the lighting control units is two. However, the number of the lighting control units and the number of the lighting apparatuses of each of the lighting control units are not limited thereto.

In the above embodiment, the dip switch sets a communication address of the master of each lighting control unit. However, a means for setting the communication address is not limited thereto.

As can be seen, the lighting system according to the embodiment includes the controller 1 configured to communicate through the power line communications, and the lighting control unit 101 including the plurality of lighting apparatuses 2, 3, and 4. The plurality of lighting apparatuses 2, 3, and 4 include the master 2 configured to communicate through the power line communications and one or more slaves 3 and 4 that can communicate with the master 2. The master 2 communicates with the controller 1 using the power line communications, and communicates with one or more slaves 3 and 4 through a communication system that is different from the power line communications. The plurality of lighting apparatuses 2, 3, and 4 control lighting in accordance with the instruction obtained through the power line communications or the instruction obtained through the communication system that is different from the power line communications.

As a result, not all of the lighting apparatuses 2, 3, and 4 need to communicate using the power line communications. Only the lighting apparatus 2 serving as the master of the lighting control unit 101 may communicate through the power line communications. This can provide the lighting system using the power line communications while reducing the number of lighting apparatuses communicating through the power line communications.

The communication system may be a near field communication. As a result, another line does not have to be provided between the master 2 and the slaves 3 and 4. This communication system is Bluetooth, for example.

The master 2 may be coupled to at least one of slaves 3 or 4 by a coupler, and they may communicate with each other via the coupler. As a result, another line does not have to be provided between the master 2 and the slaves 3 and 4. This coupler couples the housing of the master 2 and the housing of the slaves 3 and 4 together, and includes a signal line for communication therein.

In addition, the lighting apparatus serving as the master according to the embodiment includes: the light source 22; the PLC circuit 21 communicating with the external controller 1 through the power line communications; the near field communication circuit 24; and the control circuit 23 controlling the light source 22, the PLC circuit 21, and the near field communication circuit 24. When the PLC circuit 21 receives an instruction from the controller 1, the control circuit 23 controls the near field communication circuit 24 such that the instruction is transmitted to the outside, and controls the lighting state of the light source 22 according to the instruction.

Further, the lighting apparatus serving as the slave according to the embodiment includes the light sources 31 and 41, the near field communication circuits 33 and 43, and the control circuits 32 and 42 controlling the light sources 31 and 41, and the near field communication circuits 33 and 43. When the near field communication circuits 33 and 43 receive an instruction, the control circuits 32 and 42 control the lighting state of the light sources 31 and 41 according to the instruction.

Other Embodiments

In the foregoing description, the above embodiment is described as an example of the present disclosure. However, the technique according to the present disclosure is not limited to the embodiment, and is also applicable to embodiments where modifications, substitutions, additions, or omissions may be made appropriately. Moreover, each of the elements described in the embodiments may be combined, and defined as a new embodiment.

A lighting system according to the present disclosure has an advantage of controlling lighting using power line communications while reducing an increase in cost for equipment. The present disclosure is useful mainly for reducing an increase in cost for a lighting system capable of performing fine lighting control.

What is claimed is:

1. A lighting system, comprising:
    a controller including a power line communication (PLC) circuit configured to communicate through power line communications; and
    a lighting apparatus group including a plurality of lighting apparatuses having a master including a PLC circuit configured to communicate through the power line communications and at least one slave capable of communicating with the master, wherein:
    the controller is provided outside the lighting apparatus group,
    each of the PLC circuit of the controller and the PLC circuit of the master is configured to transmit or receive a signal through PLC by superposing a high-frequency current over a power line,
    the master communicates with the controller through the power line communications, and communicates with the at least one slave through a communication system that is different from the power line communications,
    the plurality of lighting apparatuses control lighting according to an instruction obtained through the power line communications or an instruction obtained through the communication system,
    the master and the at least one slave are coupled together by a coupler, and communicate with each other through the coupler, and
    the coupler couples a housing of the master and a housing of the at least one slave together, and includes a signal line for communication therein.

2. The lighting system of claim 1, wherein the housing of the master and the housing of the at least one slave are fixed to the coupler.

3. A lighting apparatus, comprising:
    a light source:
    a power line communication (PLC) circuit configured to communicate with an external controller through power line communications;
    a near field communication circuit; and
    a control circuit configured to control the light source, the PLC circuit, and the near field communication circuit, wherein:
    the PLC circuit is configured to transmit or receive a signal through PLC by superposing a high-frequency current over a power line, and
    when the PLC circuit receives an instruction from the external controller via the power line communications, the control circuit controls the near field communication circuit such that the instruction is transmitted to an outside the lighting apparatus, and controls a lighting state of the light source according to the instruction.

* * * * *